March 25, 1941.  W. L. MAXSON  2,236,375
NAVIGATOR'S REFERENCE MACHINE
Filed Oct. 4, 1939   5 Sheets-Sheet 1

INVENTOR.
WILLIAM L. MAXSON
BY
ATTORNEYS

March 25, 1941.    W. L. MAXSON    2,236,375
NAVIGATOR'S REFERENCE MACHINE
Filed Oct. 4, 1939    5 Sheets-Sheet 4

| 19 | | MARS (1939) | | | | | VENUS (1939) | | | | Aug. 18 |
|---|---|---|---|---|---|---|---|---|---|---|---|
| | | RIGHT ASCENSION | | | DECLINATION | | RIGHT ASCENSION | | DECLINATION | | |
| | | HOURS | MIN. | SEC. | DEGREES | MIN. SEC. | HOURS | MIN. SEC. | DEGREES | MIN. SEC. | |
| | | 19 | 49 | 5— | −27 | 20 | 9 | 27 0 | +16 | 36 33 | |
| | | | | | | | | 50 | | 35 | |
| | | | | | | | | 40 | | 34 | |
| | | | | | | | | 30 | | | |
| | | 19 | 49 | | −27 | 20 | 9 | 20 | | 33 | |
| | | | | 10— | | | | 10 | | 32 | |
| | | | | | | | 26 | 0 | | 31 | |
| | | | | | | | | 50 | | | |
| | | 19 | 49 | | −27 | 20 | | 40 | | 30 | |
| | | | | | | | | 30 | | 29 | |
| | | | | | | | 9 | 20 | | 28 | |
| | | 19 | 49 | 15— | −27 | 20 | | 10 | | 27 | |
| | | | | | | | 25 | 0 | | 26 | |
| | | | | | | | | 50 | | 25 | |
| | | 19 | 49 | | −27 | 20 | 0— | 40 | | 24 | |
| | | | | | | | | 30 | | 23 | |
| | | | | | | | 9 | 10 | | 22 | |
| | | | | 20— | | | 24 | 0 | | 21 | |
| | | 19 | 49 | | −27 | 21 | | 50 | | 20 | |
| | | | | | | | | 40 | | 19 | |
| | | | | | | | 9 | 30 | | 18 | |
| | | | | | | | | 20 | | 17 | |
| | | 19 | 49 | 25— | −27 | 21 | 23 | 10 0 | | 16 | |
| | | | | | | | | 50 | | 15 | |
| | | | | | | | | 40 | | 14 | |
| | | 19 | 49 | | −27 | 21 | 9 | 30 | +16 | 13 15 | |
| | | | | 30— | | 18.7 | 22 | 20 10 | | | |

Aug. 17

INVENTOR.
WILLIAM L. MAXSON
BY
ATTORNEY.

Patented Mar. 25, 1941

2,236,375

UNITED STATES PATENT OFFICE 2,236,375

NAVIGATOR'S REFERENCE MACHINE

William L. Maxson, South Orange, N. J., assignor, by mesne assignments, to Reconstruction Finance Corporation, New York, N. Y., a corporation of the United States Application October 4, 1939, Serial No. 297,791

12 Claims. (Cl. 35—43)

This invention relates to reference machines adapted for rapid, convenient and precise operation to bring any selected portion of an extensive table of reference data into precise relation to a reference point. The invention relates more particularly to a navigator's reference machine for disclosing astronomical data corresponding to a selected date and hour of Greenwich civil time. The invention is illustratively shown and described herein as applied to astronomical data for the use of navigators, but it is to be understood that the invention is not confined to that particular use.

In celestial navigation it is frequently necessary for the navigator to refer to the tables of a nautical almanac or other like reference book to obtain certain data relating to a particular planet as of a specified date and hour of Greenwich civil time. Having found the table covering the particular planet wanted and the date of that table which is wanted, the navigator then secures the desired data, such as the right ascension of the planet and the declination of the planet by looking along the page until he has located the entry opposite the hour and minute of the day. These data are then used for determining the position (latitude or longitude) of the observer, or for working out any other problem in which the ascertained data may be of use.

It is a primary object of the present invention to make tabulated data of this character more readily and conveniently available to the navigator or computer.

In accordance with a practical and advantageous embodiment of the invention the astronomical data with reference to one or more planets is tabulated upon a scroll, the data being desirably arranged in chronological order and in such spatial relation that equal scroll lengths represent equal time intervals. A relatively coarse but fast operating indexing or indicating means is provided which may include a tape or scroll having dates printed upon it in regular sequence and at regular intervals. A date input member is connected to operate the date indicating means and at the same time to advance the reference scroll in proportion to the lapse of time represented by the operation of the date input member.

An independently operable hour indicator is also provided in connection with hour and minute indicating means for effecting a relatively fine or micrometric adjustment of the reference scroll after the date has been set, the hour input means being connected to operate the reference scroll in proportion to the lapse of time represented by the hour input.

It is desirable that supply and take-up reels be provided for the reference scroll, and that the scroll itself be positively driven in either direction in proportion to the lapse of time (positive or negative) represented by the operations of the time input means. Provision is accordingly made of uniformly acting scroll feeding means for acting upon the scroll between the supply and take-up reels. Since the scroll is to be capable of reversal, the supply and take-up reels must be interchangeable in their functions, that is to say, when the scroll is driven in one direction, one of the reels must function as a take-up reel and the other as a supply reel for paying out the scroll, but when the scroll is operated in the opposite direction this condition is reversed. The take-up reel should operate in a direction to wind up the scroll and should be frictionally driven in such relation to the feeding of the scroll that no substantial slack will occur in the scroll between the scroll feeding means and the reel, notwithstanding the varying diameter of the scroll on the reel. The supply reel should be controlled to pay out the scroll under a slight tension only as it is required by the scroll feeding means, notwithstanding the varying diameter of the scroll on the supply reel.

It is an important object of the present invention to provide a scroll reel controlling means operated by the scroll feeding means in such manner that the scroll will be paid out under tension, and will be re-reeled or taken up under tension regardless of the direction in which the scroll feeding means is operated.

To this end it is an important feature that provision is made of frictional means operated by the scroll feeding means and tending always frictionally to urge both the scroll reels in reeling as distinguished from unreeling direction, regardless of the direction in which the scroll is positively fed by the scroll feeding means. For this purpose a transmission mechanism is interposed between the scroll feeding means and the frictional means, such mechanism including a reverser automatically responsive to the direction of operation of the scroll feeding means to insure that the frictional means will be always driven in the same direction and will tend to drive the scroll reels away from the point of scroll feeding. With this arrangement either reel can function as a supply reel and either can function as a take-up reel, according to the direction of drive of the scroll feeding means. The friction means serves to drive the take-up reel fast enough to take up the scroll under a moderate tension, and also to provide a frictional resistance to rotation of the supply reel in the direction in which the reel is forced to rotate by the positive drawing off of the scroll.

A further object of the invention is to provide a reference machine which will simultaneously exhibit reference data of a plurality of heavenly bodies in accordance with any selected date and hour set up. A machine of this kind has the advantage over ordinary tables that the navigator can tell by inspection of the machine which of the available heavenly bodies is likely to be most advantageously located for the purpose of an observation.

It is also an object of the invention to provide a reference scroll consisting of a reelable web having mathematical reference data arranged thereon in predetermined order and spacing, and having a continuous line of equally spaced perforations extending lengthwise of the web for web feeding purposes.

Other objects and advantages will hereinafter appear.

In the drawings forming part of this specification:

Figure 1:
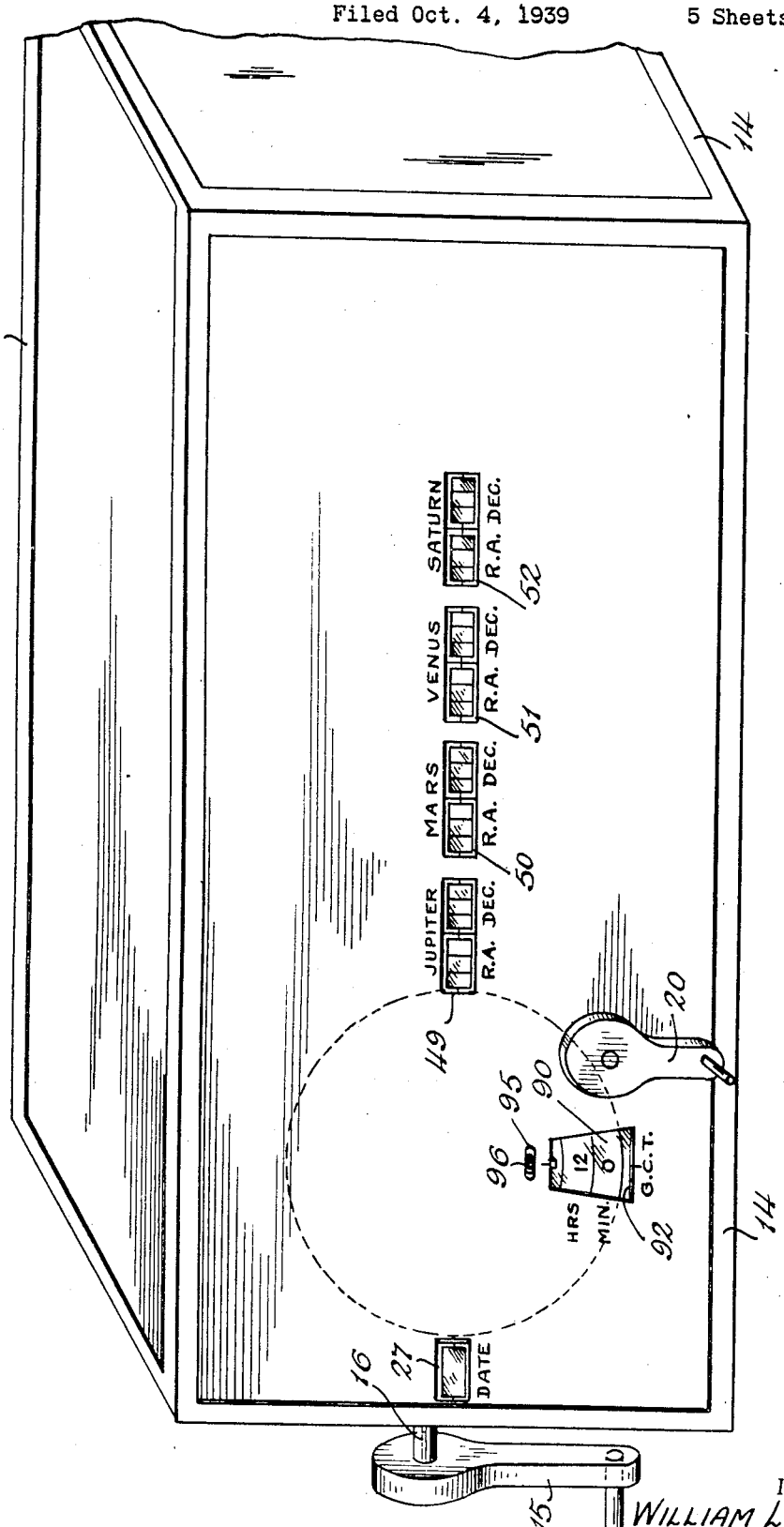
Figure 1 is a fragmentary perspective view of a reference machine embodying the invention.
Figure 2:
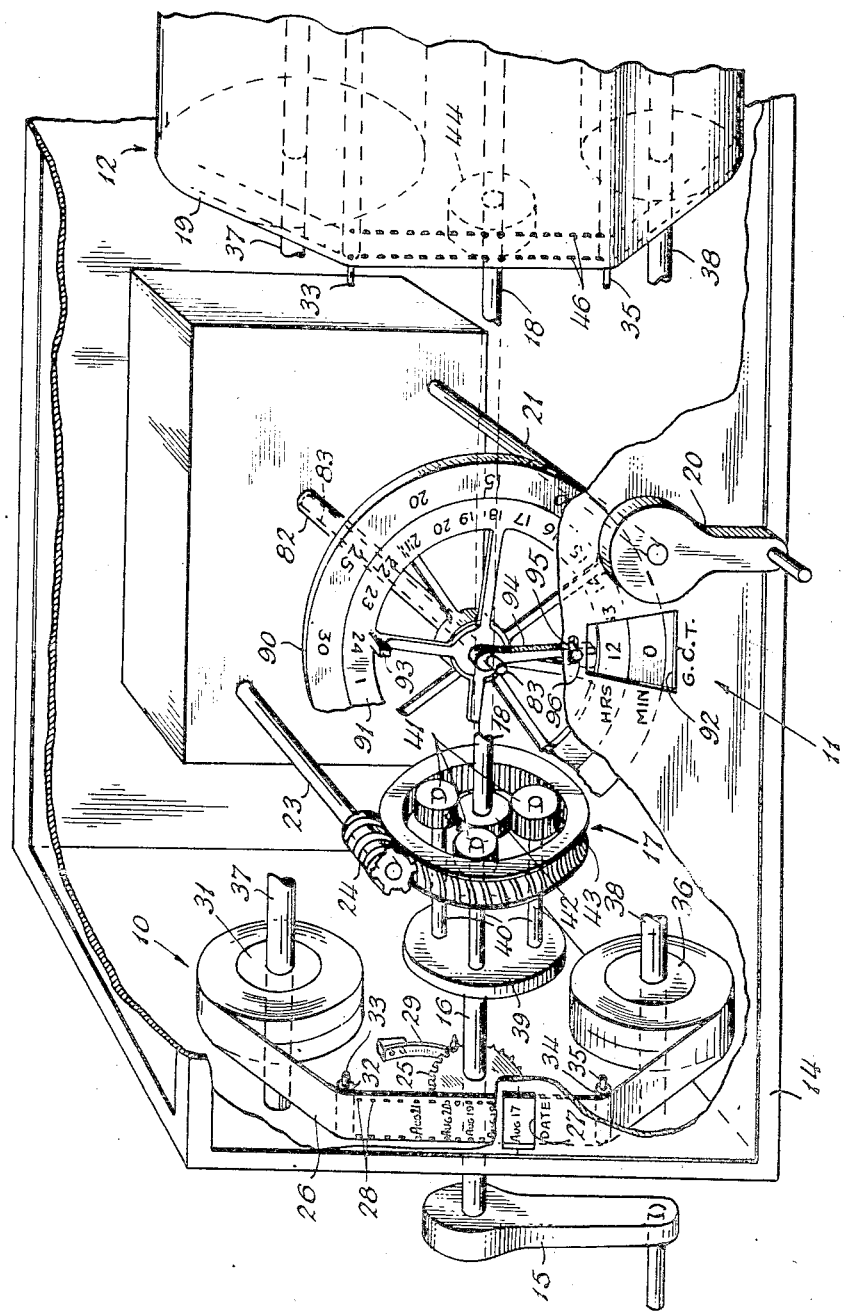
Figure 2 is a fragmentary view, partly broken away, of the machine of Figure 1, the view showing particularly the date and hour input and indicating means.

The illustrative machine of Figures 1 to 3 and 5 comprises three major parts or mechanisms, namely, a date input and indicating mechanism 10, a Greenwich civil time input and indicating mechanism 11, and a reference scroll mechanism 12. The mechanisms 10, 11 and 12 are all mounted in a single casing or housing 14 (see Figures 2 and 3).

Briefly, and without reference to detail, the mechanisms 10 and 11 are arranged to be operated each independently of the other, and each is connected to operate the mechanism 12 in proportion to the lapse of time represented by its own operation. The date mechanism serves to operate the mechanism 12 rapidly, and serves as a coarse indexing means for the reference scroll mechanism 12. The Greenwich civil time mechanism 11 serves to operate the scroll mechanism 12 less rapidly and constitutes a relatively fine or micrometric adjusting and indexing means for the scroll mechanism 12.

The date mechanism 10 comprises an operating crank 15 fast on a date input shaft 16, which shaft is connected through a differential gear 17 to operate a feed shaft 18 for a reference scroll 19.

The Greenwich civil time mechanism 11 comprises a crank 20 for operating an input shaft 21, which, through suitable gearing housed in a gear box 22, drives a shaft 23 and a worm 24 fast on the shaft 23. The worm 24 drives the scroll operating shaft 18 through the differential gear 17. The date input shaft 16 and the Greenwich civil time input shaft 21 are operable independently of one another, and each is inoperable by the other (as will be made clear). The gear ratios from the shafts 16 and 21 to the shaft 18 are so chosen that the extent of operation of the shaft 18 resulting from operation of either the shaft 16 or the shaft 21 is proportional to the lapse of time represented by the extent of operation of the shaft 16 or the shaft 21 as the case may be. A slight operation of the shaft 16, however, corresponds to an extensive operation of the shaft 21.

The shaft 16 has fast upon it a feed sprocket 25 for feeding a date tape 26 across a sight opening 27 of the housing 14. The tape 26 is formed with a continuous row of equally spaced perforations 28 for cooperating with the teeth of the sprocket 25. A detent spring 29 affixed to a stationary block 30 cooperates with the teeth of the sprocket 25 to cause the sprocket to be advanced through equal steps, each equal to a day space or an aliquot part of a day space on the date tape 26. Thus, the detent 29 and sprocket 25 may be utilized to induce the date input mechanism always to come to rest in determinate positions separated exactly from one another by full day intervals. The detent serves also to hold the date mechanism stationary during operation of the Greenwich civil time mechanism 11.

The date tape 26 has printed upon it in chronological order and at uniform intervals all of the dates included in the period covered by the reference scroll 19. The space allotted to each date on the date tape corresponds to one or more tooth spaces of the sprocket 25. The tape 26 when fed downward (that is in advancing date order) is unreeled from a supply reel 31, passed around an idler roller 32 which is journaled upon a supporting rod 33, thence past the feed sprocket 25, a sight opening 27, around an idler roller 34 which is journaled upon a supporting rod 35, and is taken up onto a take-up reel 36. The reels 31 and 36 are frictionally mounted upon revoluble shafts 37 and 38, respectively.

The operation of the shafts 37 and 38 will be described in detail farther on, but it may be mentioned at this point that the shafts 37 and 38 are constantly driven in directions tending to draw the date tape away from the point at which the tape 26 is positively fed by the sprocket 25. The shafts 37 and 38 urge, but do not compel, the reels 31 and 36, respectively, to turn with them. Thus when the tape is fed from the reel 31 onto the reel 36 the shaft 37 serves as a brake for the reel 31 to resist paying out of the tape, and to maintain the tape under tension while the shaft 38 serves frictionally to drive the reel 36 at a sufficiently rapid rate to cause the tape which has passed the sprocket 25 to be taken up under tension by the reel 36. When the tape is fed in the opposite direction, that is, from the reel 36 onto the reel 31, the shaft 38 serves as a brake for the reel 36, and the shaft 37 serves as a take-up drive for the reel 31.

The date tape serves as a measure or index of the extent of operation of the date input shaft 16. The shaft 16 has fast upon it a disc 39 which carries stub shaft 40, upon which are journaled planetary pinions 41 of the differential gear 17. The planetary pinions 41 mesh with and drive a sun gear 42 fast on the scroll operating shaft 18. The planetary pinions also mesh with a combined worm and ring gear 43. The worm portion of the gear 43 is in mesh with the worm 24 on the shaft 23 of the Greenwich civil time mechanism 11. The pitch of the worm 24 is such that the gear 43 cannot drive the worm 24. During operation of the shaft 16, therefore, the gear 43 remains stationary and the entire output of the shaft 16 is transmitted to the shaft 18 with multiplied effect.

The shaft 18 has fast upon it a pair of sprockets 44 for driving the scroll 19. Each sprocket 44 as illustrated has two rows of teeth 45 for engaging two rows 46 of feeding perforations formed in the associated margin of the scroll 19. It is to be understood, of course, that a single row of perforations and a single set of sprocket teeth on each sprocket would serve in many instances, and that the double row arrangement is, therefore, to be regarded as purely illustrative.

The reference scroll 19, when fed downward, is drawn off of a reel 47 which is frictionally mounted on the shaft 37, around an idler roller 48 journaled on the rod 33, and past the feed sprockets 44. After passing the feed sprockets 44 the scroll 19 travels across sight openings 49, 50, 51 and 52 formed in the housing 14, thence around an idler roller 53 journaled upon the rod 35 and onto a reel 54 which is frictionally mounted upon the shaft 38.

The scroll mechanism is adapted to be operated in either direction. When the scroll is fed downward, the shaft 37 serves as a frictional brake for the reel 47 and the shaft 38 serves as a frictional driver for the reel 54. When the scroll is fed upward the shaft 38 serves as a frictional brake for the reel 54 and the shaft 37 serves as a frictional driver for the reel 47.

In order that the kind of operation above outlined may be secured, it is necessary that the shafts 37 and 38 be driven from the shaft 18, and that the shaft 18 shall drive each shaft in a direction to urge its associated reel in reeling direction, regardless of the direction of rotation of the shaft 18.

The mechanism for operating the shafts 37 and 38 from the shaft 18 in the manner stated comprises a gear 55 fast upon the shaft 18 which, through a gear 56 fast upon a stub shaft 57, drives a gear 58 fast upon a shaft 59. The shafts 18, 57 and 59 are supported, respectively, in bearings 60, 61 and 62 mounted in a frame bracket 63. The shaft 59 has fast upon it a gear 64 which is adapted to drive a gear 65 fast on a shaft 66 either directly or reversely according to the direction of rotation of the gear 64 through the medium of an automatic reversing device 67.

The automatic reversing device 67 comprises a lever 68 supported on a pivot pin 69 which is affixed to the frame bracket 63. The lever at one end carries a shaft 70 upon which a gear 71 is revolubly mounted. The lever at its opposite end carries a shaft 72 upon which a gear 73 is revolubly mounted. The gears 71 and 73 are constantly in mesh with one another, and the gear 71 is constantly in mesh with the gear 64. The gears 71 and 73 are, however, adapted to be meshed alternatively with the gear 65 by the rocking of the lever 68. Thus, when the lever is in the position illustrated in Figure 3, the gear 73, though rotated, is ineffective, the drive being transmitted from gear 64 through gear 71 to gear 65. The gear 65 is then driven in the same direction in which the gear 64 is rotating.

Figure 3:
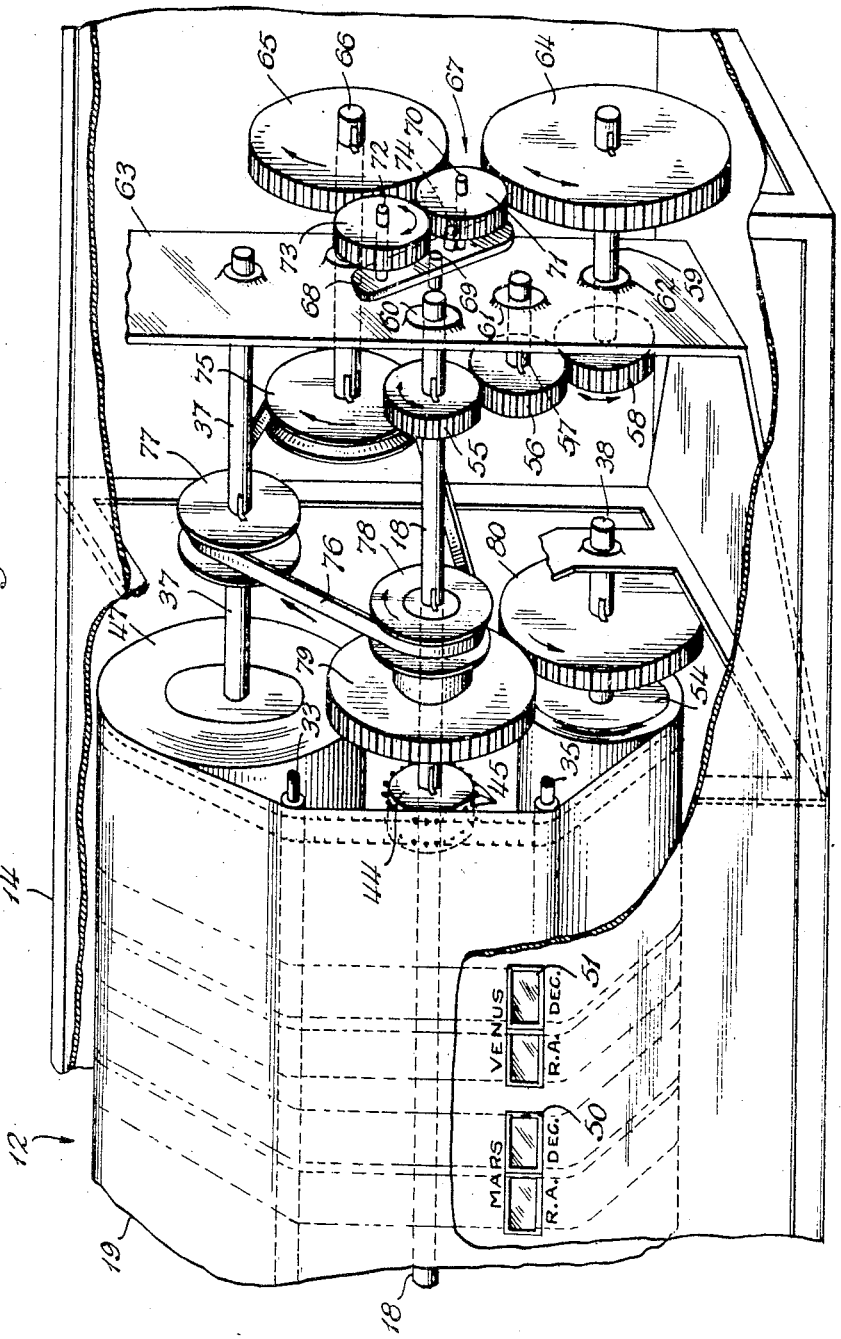
Figure 3 is a fragmentary perspective view of the right-hand end of the machine of Figure 1, the view showing particularly a reference scroll and the operating mechanism more immediately associated with said scroll.

When the lever 68 is rocked clockwise as viewed from the right of Fig. 3 to carry the gear 73 into mesh with the gear 65 and the gear 71 out of mesh with the gear 65, the drive is from the gear 64 through the gears 71 and 73 to the gear 65, and hence the gear 65 is rotated in the direction opposite to that in which the gear 64 is rotated.

The rocking of the lever 68 to one position or the other is automatically effected in response to the direction of rotation of the gear 64. A spring pin 74 carried by the lever 68 bears frictionally against a face of the gear 71, to oppose rotation of the gear 71 yieldingly, and thereby to induce rocking of the lever 68 for carrying the gear 71 or the gear 73, as the case may be, fully into mesh with the gear 65 as a first consequence of rotation of the gear 64. When the lever is in the position shown in Figure 3 and the gear 64 is rotated counter-clockwise, as viewed in Figure 3, the first effect of such rotation will be to rock the lever clockwise and thereby to take the gear 71 out of engagement with the gear 65 and place the gear 73 in mesh with the gear 65. After the lever has been thus shifted, the gear 71 will turn against the frictional resistance of the pin 74, so that the gear 65 is driven clockwise through the gears 71 and 73. If thereafter the gear 64 is turned clockwise, the lever 68 will be reversely shifted to carry the gear 73 out of mesh with the gear 65 and the gear 71 into mesh with the gear 65. When the lever has thus been shifted back to the illustrated position, the continued clockwise rotation of the gear 64 produces clockwise rotation of the gear 65 through the medium of the gear 71. Regardless of whether gear 64 is rotated clockwise or counter-clockwise, it always drives the gear 65 in a clockwise direction.

The shaft 66, upon which the gear 65 is made fast, also has fast upon it a pulley 75 which through a belt 76 drives clockwise (as viewed in Fig. 3) a pulley 77 fast upon the shaft 37 and a pulley 78 revoluble upon the shaft 18. The pulley 78 has fast with it a gear 79 which drives a gear 80 fast upon the shaft 38 in a counter-clockwise direction. It is evident that the mechanism described is effective to drive the shafts 37 and 38 from the shaft 18, that the direction of rotation of the shaft 37 will always be clockwise regardless of the direction of rotation of the shaft 18, and that the direction of rotation of the shaft 38 will always be counter-clockwise regardless of the direction of rotation of the shaft 18.

The drive from the shaft 66 to the shafts 37 and 38 is illustrated as impositive, although it could just as well be a positive drive so long as the effect of the shaft upon the reels 31 and 47 is frictionally transmitted, and the effect of the shaft 38 upon the reels 36 and 54 is frictionally transmitted. In any event, the drive from the shaft 66 to the shafts 37 and 38 should be more positive than the drives between the shafts 37 and 38 and the reels which are, respectively, mounted upon the latter shafts.

As illustrated, the pulley 75 is formed with a V-groove while the pulleys 77 and 78 are formed with flat belt-engaging faces. The belt 76 is a V belt which grips the V-groove of the pulley 78 to provide a substantially nonslipping engagement. Because of the V face engagement of the belt with both flat face pulleys 77 and 78 there is a tendency to slip under an excessive load.

Figures 4, 5:
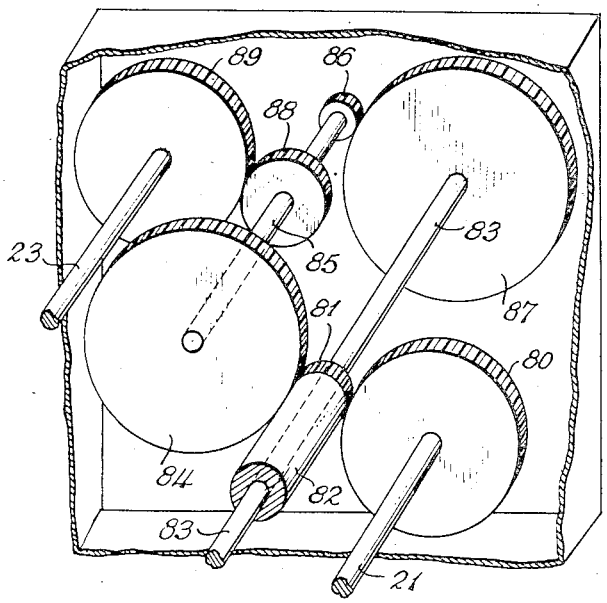
Figure 4 is a fragmentary view, partly broken away, illustrating on an enlarged scale and with greater particularity the scroll of Figure 3.
Figure 5 is a fragmentary, detail, perspective view, partly broken away, illustrating gearing of the hour input and indicating means.

Assuming that the Greenwich civil time mechanism is set to indicate no hours and no minutes, operation of the crank 15 to bring the date August 17 into the sight opening 27, as shown, will be effective to bring the point on the scroll 19 represented by the line designated Aug. 17 in Figure 4 in line with the index marks at the sight openings 49, 50, 51 and 52 of Fig. 1. Further operation of the crank 15 to bring the date Aug. 18 into line with the index mark of the sight opening 27 will cause the scroll 19 to be shifted until that portion represented by the line designated Aug. 18 in Figure 4 is in line with the index marks of the sight openings 49, 50, 51 and 52 of Fig. 1.

Assuming that the crank has been operated, however, to set up the zero hour of Aug. 17, it is now necessary to adjust the scroll 19 precisely to some point between the lines designated Aug. 17 and Aug. 18 corresponding to the Greenwich civil time of August 17 which is of interest. This adjustment is performed by operating the crank 20 to effect operation of the Greenwich civil time mechanism 11.

Rotation of the crank 20 turns the shaft 21 which has fast upon it a gear 80. The gear 80 drives a gear 81 fast upon a sleeve shaft 82. The sleeve shaft 82 is arranged to be given one complete rotation by the gear 80 for each hour of input. The sleeve shaft 82 is journaled upon a shaft 83 which is adapted to be given one complete rotation for an input of 24 hours. The gear 81 which rotates in unison with the shaft 82 drives a gear 84 fast upon a shaft 85. The shaft 85 also has fast upon it a gear 86 which meshes with and drives a gear 87 fast on the shaft 83. The described transmission from the gear 81 to the gear 87 is arranged to effect a speed reduction in the ratio of 24 to 1.

The shaft 85 also has fast upon it a gear 88 which drives a gear 89 fast upon the shaft 23. The shaft 23, it will be remembered, has fast upon it the worm 24 for driving the combined ring and worm gear 43 of the differential 17. The transmission is so arranged that a 24 hour input to the Greenwich civil time mechanism from the crank 20 on the shaft 21 drives the shaft 18 in the same direction and to the same extent as a one day input from the crank 15 and the shaft 16 of the date input mechanism.

The sleeve shaft 82 has fast upon its forward end a spoked wheel 90 whose margin is graduated and indexed to show minutes. The shaft 83 has fast upon its forward end a spoked wheel 91 whose margin is graduated and indexed to show hours. The margins of the wheels 90 and 91 operate across a sight opening 92 formed in the front face of the casing 14, and form a Greenwich civil time indicator, so that the operator may be guided in running in Greenwich civil time to the hour and minute desired.

Provision is made for limiting rotation of the wheel 91 to exactly one full revolution so that the Greenwich civil time indicator cannot be turned backward beyond no hours and no minutes, nor forward beyond 24 hours. For this purpose a fixed stop 93 is provided upon the wheel 91 and a cooperating stop arm 94 is pivotally mounted upon the forward end of the shaft 83. The stop 94 has fixed upon it a pin 95 which extends forward through a short arcuate slot 96 formed in the front wall of the casing 14. The ends of the slot 96 limit movement of the pin 95 and the stop 94, the arrangement being such that the stops 93 and 94 cooperate to arrest the wheels 90 and 91 substantially in the zero indicating position and the 24 hour indicating position.

It will be evident from what has been said that the date input mechanism and the Greenwich civil time input mechanism are operable independently of one another, and that each is arranged to advance the shaft 18 in proportion to the lapse of time represented by its own operation.

The scroll 19 may be made to carry any reference data desired. As illustrated, it is worked out to show the right ascension and the declination of the planets Jupiter, Mars, Venus and Saturn. The navigator, knowing the date and the hour in Greenwich civil time can operate the present machine to bring into view the appropriate data for all four planets before he has taken an actual observation with reference to any one of them. He then has available for comparison the data relative to all of them and may be guided by such data, among other considerations, in determining which planet to use for observation. The data for the selected planet is then read off of the appropriate portion of the scroll and utilized in the customary way. In the case of a scroll like that of Figure 4, the data for all the planets is entered on a single scroll.

The length of scroll 19 chosen to represent the passage of a definite period of time, say one day, is uniform throughout the length of the scroll and is necessarily the same for each table or column entered on the scroll because fixed driving ratios are established from the date and hour input means to the single scroll operating means. Some planets, however, change positions relative to a terrestrial observer more rapidly than others. All planets change positions at variable rates. Then, too, the rate of change of declination differs from the rate of change of right ascension for any selected planet. Where two or more tables are included upon a single scroll, it is necessary to allot a sufficient scroll length to the passage of each day to assure that the table which includes the most rapid changes of tabulated values will afford suitably precise readings in that portion which covers the period of such changes.

If separate scrolls are provided for each table or for each group of tables whose minimum space-time requirements are not radically different, and appropriate individual driving trains are establishing to the several scrolls, the scroll length allotted to the passage of a day, though uniform throughout each scroll, may be different from that of any other scroll, and may be chosen to assure that the portion of that particular scroll which includes the most rapid changes of tabulated values will afford suitably precise readings. One scroll may, therefore, be considerably shorter than another. In some instances an arrangement of this kind is preferable to the simpler arrangement of tabulating all data on a single scroll as in Figure 4. Such an arrangement may be secured by modifying the structure of Figures 1 to 5 in the manner illustrated in Figures 6 and 7.

Figures 6, 7:
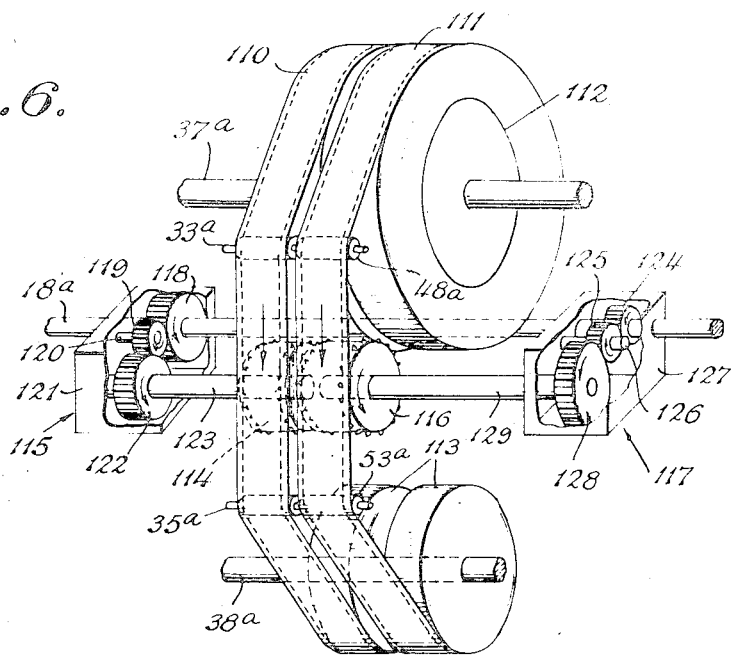
Figure 6 is a detail perspective view of scroll mechanism employed in a modified embodiment of the invention.
Figure 7 is a fragmentary view illustrating portions of the reference scrolls of Figure 6 arranged side by side.

In Figure 6 the mechanism is generally the same as that disclosed in Figures 1 to 3 and 5. The corresponding parts have accordingly been assigned corresponding reference numerals with the subscript *a* added. The scroll operating shaft 18a is driven in the same manner as before from the date input mechanism and from the Greenwich civil time input mechanism. It is connected as before to operate the shafts 37a and 38a. Provision is made, however, of separate scrolls 110 and 111, each mounted upon its own individual reel 112 on the shaft 37a and each mounted upon its own individual reel 113 on the shaft 38a. Each reel 112 has frictional bearing upon the shaft 37a, and each reel 113 has frictional bearing upon the shaft 38a.

Each of the scrolls 110 and 111 has a uniform space-time relationship as did the scroll 19 of Figure 4; that is to say, equal scroll lengths in each instance represent equal intervals of time. The time-space relationship of the scroll 110 is not, however, the same as the time-space relationship of the scroll 111. The lapse of one day is represented by the space between the lines designated Nov. 16 and Nov. 17 at the left of Figure 7 for the scroll 110, while the lapse of one day is represented by the space between the lines marked Nov. 16 and Nov. 17 at the right of Figure 7 for the scroll 111.

Provision is made of mechanism for causing the scrolls 110 and 111 to be advanced in proportion to the linear extent of their respective day intervals. To this end the shaft 18a is connected to drive a feed sprocket 114 in one ratio through one set of gear mechanism indicated generally at 115, and to drive a feed sprocket 116 for the scroll 111 in another ratio through transmission mechanism indicated generally by the reference numeral 117.

The transmission mechanism 115 comprises a gear 118 fast on the shaft 18a, a transmission pinion 119 journaled on a stub shaft 120 which is carried by a gear box 121, and a gear 122 fast on the shaft 123 of the feed sprocket 114. Similarly, the gearing 117 comprises a gear 124 fast on the shaft 18a, a pinion 125 mounted on a stub shaft 126 which is carried by a gear box 127, and a gear 128 fast on the drive shaft 129 of feed sprocket 116. The gear ratio in each instance is chosen to accord with the length of a day interval on the scroll to be driven.

It is evident that the principle illustrated in Figure 6 could be extended, if desired, by providing a multiplicity of individual scrolls each having its own individual space-time relation and its own individual drive appropriate to that relation. The shafts 37a and 38a will provide for supply braking and take-up feeding of as many reels as may be frictionally mounted upon them, notwithstanding the fact that the delivery and take-up rates of the several scrolls may all be differnet from one another.

Where two or more reference scrolls such as 110 and 111 are provided to be driven at different rates, each scroll runs over its own individual idler rolls 48a and 53a upon the rods 33a and 35a.

I have described what I believe to be the best embodiments of my invention. I do not wish, however, to be confined to the embodiments shown, but what I desire to cover by Letters Patent is set forth in the appended claims.

I claim:

1. A navigator's reference machine comprising, in combination, a scroll having tabulated reference values which vary with time in accordance with a definite, non-linear law of variation arranged thereon in chronological order and in which equal scroll lengths are adapted to represent equal time intervals, said scroll being formed with a longitudinal line of feeding perforations, delivery and take-up means for the scroll including delivery and take-up reels, a feed sprocket cooperative with the scroll perforations, a date input means, date indicating means operated thereby, an hour input means, hour indicating means operated thereby, and means responsive to the date and hour input means in different ratios for advancing the feed sprocket in proportion to the lapse of time represented by the combined advance of said input means.

2. A navigator's reference machine as set forth in claim 1 in which the date and hour input means are operable each independently of the other and in which a differential gear is provided having one input operable by the date input means, a second input operable by the hour input means, and an output connected to operate the scroll feeding sprocket.

3. A navigator's reference machine as set forth in claim 1 in which the date and hour input means are operable each independently of the other and in which a differential gear is provided having one input operable by the date input means, a second input operable by the hour input means, and an output connected to operate the scroll feeding sprocket, and which further includes provision for mechanically preventing operation of either the date input means or the hour input means in response to operation of the other.

4. A navigator's reference machine as set forth in claim 1 in which three parallel shafts are provided, the scroll reels are frictionally connected, respectively, with two of the shafts, and the scroll feed sprocket is affixed to the third, said machine comprising a transmission means from the scroll feed shaft to the reel shafts including reversible driving connections automatically responsive to the direction of rotation of the feed sprocket shaft to cause each of the reel shafts to be driven in reeling direction in response to rotation of the feed sprocket shaft in either direction.

5. A navigator's reference machine comprising, in combination, a scroll having tabulated reference values which vary with time in accordance with a definite, non-linear law of variation arranged thereon in chronological order and in which equal scroll lengths are adapted to represent equal time intervals, said scroll formed with a longitudinal line of feeding perforations, a feed sprocket cooperative with the scroll perforations, date input means, date indicating means operated thereby, means responsive to operation of the date input means for operating the scroll feed sprocket in proportion to the operation of the date input means to advance the scroll to the position corresponding to a definite hour of any selected and indicated date, and input means for running in the time of day, the latter input means being connected to adjust the position of the scroll micrometrically in accordance with the time of day.

6. A navigator's reference machine comprising, in combination, a scroll having tabulated reference values which vary with time in accordance with a definite, non-linear law of variation arranged thereon in chronological order and in which equal scroll lengths are adapted to represent equal time intervals, a second similar scroll in which the space-time relation is also uniform, but is different from that of the first, each scroll being formed with a line of feeding perforations, feed sprockets for the respective scrolls, date and hour input members independently operable, a common feed sprocket operating shaft operated by the date and hour input members, and separate gear connections from the common sprocket operating shaft to the respective feed sprockets, each providing a driving ratio appropriate to the space-time relation of the scroll whose sprocket it drives.

7. A navigator's reference machine comprising, in combination, a scroll having tabulated reference data arranged thereon in prescribed sequence lengthwise of the scroll, a pair of scroll reels, scroll feeding means interposed between the reels, a driving shaft for the scroll feeding means, and means driven by the scroll feeding means for frictionally urging both reels in reeling direction regardless of the direction of operation of the scroll feeding means.

8. A navigator's reference machine comprising, in combination, a scroll having tabulated reference data arranged thereon in prescribed sequence lengthwise of the scroll, a pair of scroll reels, scroll feeding means interposed between the reels, a driving shaft for the scroll feeding means, friction means for applying slip torques to the reels which tend to rotate the reels in reeling direction, and reversible driving connections between the scroll feed driving shaft and the friction means responsive to the direction of rotation of said shaft to cause the friction means to be driven in the same direction in response to rotation of the scroll feed driving shaft in either direction.

9. A navigator's reference reference machine as set forth in claim 8 in which the reversible driving means for the friction means comprises a first transmission gear having fixed driving connections with the scroll feed shaft to be constantly driven therefrom, a second transmission gear having fixed driving connection with the friction means, an intermediate gear carrier shiftable by the first transmission gear, a pair of intermediate gears mounted on the gear carrier in constant mesh with one another, one of said intermediate gears being arranged to be constantly in mesh with the first transmission gear, and the two intermediate gears arranged to be alternatively engaged with the second transmission gear according to the position of the carrier.

10. A navigator's reference machine as set forth in claim 8 in which the reversible driving means for the friction means comprises a first transmission gear having fixed driving connections with the scroll feed shaft to be constantly driven therefrom, a second transmission gear having fixed driving connection with the friction means, an intermediate gear carrier shiftable by the first transmission gear, a pair of intermediate gears mounted on the gear carrier in constant mesh with one another, one of said intermediate gears being arranged to be constantly in mesh with the first transmission gear, and the two intermediate gears arranged to be alternatively engaged with the second transmission gear according to the position of the carrier, and means on the carrier for frictionally engaging one of the intermediate gears yieldingly to oppose rotation of the intermediate gears and thereby to induce shifting of the carrier.

11. A navigator's reference machine comprising, in combination, a scroll having tabulated reference values which vary with time in accordance with a definite, nonlinear law of variation arranged thereon in chronological order and in which equal scroll lengths are adapted to represent equal time intervals, delivery and take-up means for the scroll including delivery and take-up reels, a date input means, date indicating means operated thereby, an hour input means, hour indicating means operated thereby, and means responsive to the date and hour input means in different ratios for advancing the scroll in proportion to the lapse of time represented by the combined advance of said input means.

12. A navigator's reference machine as set forth in claim 6 which further includes supply and take-up reels for each scroll at opposite sides of the scroll feed point, rotary means for frictionally urging the reels in reeling direction, and means for driving said rotary means in a single direction in response to operation of the feed sprocket operating shaft in either direction.

WILLIAM L. MAXSON.